United States Patent
Yeh et al.

(10) Patent No.: US 8,738,083 B2
(45) Date of Patent: May 27, 2014

(54) OPERATING METHOD, APPARATUS, AND MEMORY MODULE INTEGRATED WITH WIRELESS COMMUNICATION COMPONENT

(75) Inventors: Fu-Jen Yeh, Hsinchu (TW); Ching-Yuan Lee, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 11 days.

(21) Appl. No.: 13/466,111

(22) Filed: May 7, 2012

(65) Prior Publication Data

US 2013/0295996 A1  Nov. 7, 2013

(51) Int. Cl.
   *H04B 1/38* (2006.01)
(52) U.S. Cl.
   USPC .......................... 455/558; 455/41.1; 455/557
(58) Field of Classification Search
   USPC ................ 455/557, 558, 41.1–41.3; 711/153; 710/22, 23
   See application file for complete search history.

(56) References Cited

U.S. PATENT DOCUMENTS

| | | | |
|---|---|---|---|
| 6,405,278 B1* | 6/2002 | Liepe | 711/103 |
| 2006/0056326 A1* | 3/2006 | Croome | 370/315 |
| 2007/0073937 A1* | 3/2007 | Feinberg et al. | 710/62 |
| 2009/0319734 A1* | 12/2009 | Aihara | 711/161 |
| 2011/0252191 A1* | 10/2011 | Chang | 711/105 |

* cited by examiner

*Primary Examiner* — Lester Kincaid
*Assistant Examiner* — Daniel Lai
(74) *Attorney, Agent, or Firm* — Li & Cai Intellectual Property (USA) Office

(57) ABSTRACT

Disclosed herein is related to an operating method, and a memory module with wireless communication component. An exemplary example of the invention describes the memory module providing a control unit which coupled to both a wireless communication component such as an NFC chip, and anon-volatile memory unit. The memory module exemplarily uses an eMMC bus to interconnect a cellular phone system and the control unit. It is advantaged that when any data required to be transmitted between the NFC chip and the cellular phone system, a partition is specified to the chip according a partition table for further access task.

13 Claims, 4 Drawing Sheets

OPERATING METHOD, APPARATUS, AND MEMORY MODULE INTEGRATED WITH WIRELESS COMMUNICATION COMPONENT

BACKGROUND

1. Technical Field

The present disclosure relates to an operating method, an apparatus and a memory module integrated with wireless communication component, in particular, to provide a low-cost solution of integrating a memory controller and a wireless communication chip into one package applicable to a handheld apparatus.

2. Description of Related Art

Various types of flash-based mass storage memories prevail widely in the modern electronic appliances. One of the various memory types is the Multimedia Card (MMC) that is configured to be a non-volatile memory card standard unveiled in 1997 by Siemens AG and SanDisk. Until now, MMC standard is often used in most devices which support SD (secure digital) cards.

The MMC-standard memory has been widely used as a storage medium for a portable device. Moreover, many portable devices may adopt this MMC-standard memory inside the devices for more efficient use, which implements an embedded MMC (eMMC) standard of memory. eMMC describes architecture of an embedded storage solution with MMC interface, non-volatile memory and controller, which are fabricated into a small ball grid array (BGA) package.

With the adoption of the built-in mass storage memory such as the described eMMC memory, the modern cellular phones are also equipped with the wireless module for processing wireless communication, such as GPRS, 3G, and even a near-field communication (NFC) technology. The manufacturer of the related products therefore develops a module with a package of both the eMMC component and the NFC component. Reference is made to FIG. 1.

FIG. 1 schematically depicts a block diagram of a module packaging two components in accordance with the conventional technology. The shown portable communication device 10 includes cellular phone system module 101, NFC (near-field communication) component 105, and antenna 107, and an eMMC component 106. The NFC (near-field communication) component 105 is connected to the cellular phone system module 101 via a bus 102, such as UART or SPI. The eMMC component 106 uses it proprietary eMMC bus 103 to connect the cellular phone system module 101.

The described eMMC component 106 includes a controller (not shown) for primarily managing the non-volatile memory access processes between the cellular phone system module 101 and the non-volatile memory unit 108. That means the eMMC controller manages the MMC communication protocol, including memory read/write tasks, memory block management, and block allocation.

On the other hand, the mentioned NFC unit is provided for the cellular phone system module 101 with this device 10 to process the NFC wireless signals. Near field communication (NFC) is a set of standards for cellular phones or similar devices, and used to establish radio communication with other devices as touching them together or bringing them into close proximity. The cellular phone system module 101 may interact with the other device with NFC functionality using NFC signals. For example, the cellular phone system module 101 may initiate an NFC handshaking process when the cellular phone system module 101 detects the other device within a short distance specified by the NFC protocol. The two devices may interactively process the data exchange when the communication channel is established after the handshaking process.

In the aspect of the reference described in FIG. 1, the cellular phone system module 101 actually processes the data by the eMMC component 106 and the signals through the NFC unit separately via the bus 102 and the eMMC bus 103. The data transmitted through the NFC component 107 and through the bus 102 should be sent to the cellular phone system module 101, and then stored to the eMMC component 106 via the eMMC bus 103.

In the conventional technology, the memory of the eMMC component 106 is a kind of non-volatile memory used to store data from the cellular phone system module 101. When the data received through the NFC unit shown in the figure, the data may be temporarily stored in the volatile memory of the cellular phone system module 101, for example the RAM in the cellular phone. After that, the data may be permanently written into the non-volatile memory as the cellular phone system module 101 sends the data to the eMMC component 106.

SUMMARY

One of the objectives of the invention is to combine an eMMC component with an NFC chip into one package. In particular, the pins of the cellular phone system module may be reduced since the eMMC controller is configured to process the tasks originally conducted by the NFC component according to the present disclosure. Further, the bus originally serving the NFC communication is superseded by the eMMC bus used for eMMC component in accordance with one embodiment of the invention. This package is preferably a built-in module of a device, such as a cellular phone, portable electronic device, or any standalone apparatus.

In one aspect of the invention, a memory module is disclosed to be integrated with a wireless communication component and embedded in a wireless communication device. The memory module is originally designed for eMMC (embedded MultiMediaCard) component, preferably including memory controller and a non-volatile memory unit. In one embodiment of the invention, the memory module is integrated with the wireless communication component, for example an NFC (Near-Field Communication) chip and an antenna set preferably includes an NFC reader and its RF circuit.

The memory module further includes a control unit which is packaged of pins wired to the wireless communication component, the antenna set and the non-volatile memory unit. Further, a data bus interconnected with a cellular phone system and the control unit is also disclosed.

In one embodiment, the wireless communication device may be implemented as a cellular phone or other types of portable devices.

According to one of the embodiments of the invention, the wireless communication component may be an NFC chip, which is packaged of an NFC reader and an NFC RF component. Further, the control unit is originally designed for eMMC component, including a non-volatile memory. More specifically, when the control unit accesses the NFC chip, the control unit is intermediated to process the data exchange between the NFC chip and the cellular phone system over an eMMC bus. This MultiMediaCard bus is designed to connect either solid-state mass-storage memory or I/O devices in a card format to multimedia applications. The bus implementation allows the coverage of application fields from low-cost systems to system with a fast data transfer rate.

In one further aspect of the invention, an operating method for the memory module integrated with wireless communication component and embedded in a wireless communication device is disclosed. The access process from the control unit may be initiated when a request is raised. For example, when the NFC component detects any other NFC signal, the control unit then configures a partition table under a transferring state. The control unit therefore switches a partition specified to the wireless communication component, and sets the partition for accessing the wireless communication component. After that, a notification is generated to the cellular phone system. The cellular phone system accesses the wireless communication component via the control unit coupled to the wireless communication and a non-volatile memory unit.

During the access process, the control unit acts as a bridge to transfer the data between the cellular phone system and the wireless communication component. When the control unit receives data from the cellular phone system, the control unit filters available data, and transfers available data to the wireless communication component.

The scheme to integrate the memory controller with the wireless communication component particularly makes the invention achieving a low-cost apparatus.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
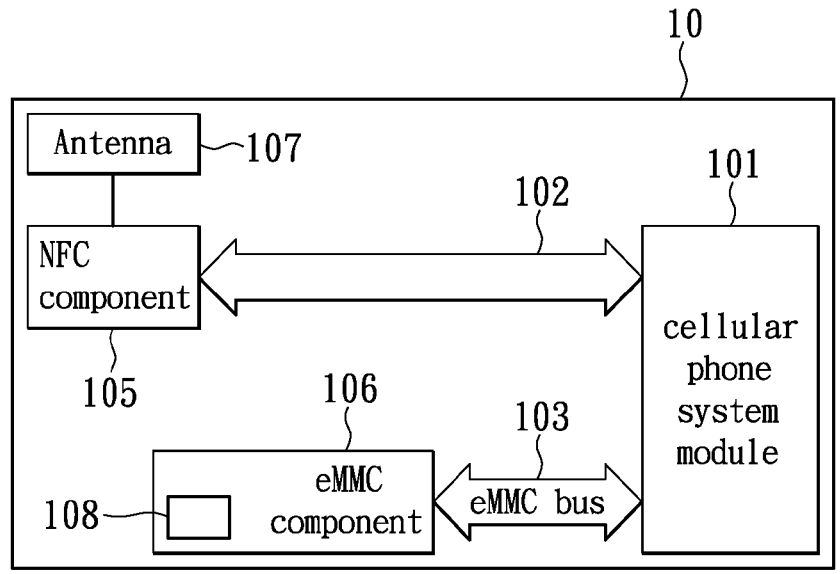
FIG. 1 schematically depicts a block diagram of a module packaging two components in accordance to the conventional technology.

Reference will now be made in detail to the exemplary embodiments of the present disclosure, examples of which are illustrated in the accompanying drawings. Wherever possible, the same reference numbers are used in the drawings and the description to refer to the same or like parts.

With the recent development of the mobile electronic devices, the device is getting to be integrated with many functional items, such as removable memory card, USB (universal serial bus) device, and one additional wireless module. One of the applications such as NFC (Near Field communication) technology benefits the cellular phone or other complementary devices to conduct a short-distanced communication.

Near field communication (NFC) is a set of standards usually for smartphones and similar devices to establish radio communication with each other by touching them together or bringing them into close proximity. For commercial applications, this NFC technology allows the device to implement electronic wallet, or to exchange data with other NFC-enabled device without too much handshaking steps at initial stage.

In order to provide a solution for efficiently combining the additional functions into the widespread appliances, especially the useful communications among the electronic devices, disclosed in the present disclosure is related to a memory module in a device. In accordance with the present disclosure, the memory module preferably integrated with a wireless communication component is disclosed. Rather than the prior use of the separate modules of the wireless communication component and the memory component in the device, one of the aspects of the invention is to integrate the wireless communication component and a general memory component into one memory module. In particular, the scheme of integration of the two components into one module reduces the cost of whole device. Further, the pins in one package of the memory module may also be shared with the two components. According to an embodiment of the present invention, it is beneficial that the original eMMC controller owns many pins; some of the pins can be shared to be the pins for NFC component.

In one embodiment of the present invention, the memory module may be implemented by an eMMC-enabled (embedded MultiMediaCard) module. eMMC describes an architecture including an embedded storage solution with MMC interface, a non-volatile memory and a controller. All in a small ball grid array (BGA) package is a preferable solution.

Figure 2:
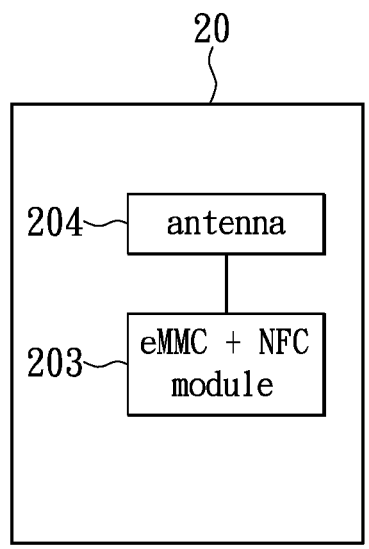
FIG. 2 depicts a block diagram illustrating an aspect of a memory module integrated with a wireless component in accordance with the present invention.

Reference is made to FIG. 2 which depicts a block diagram illustrating an aspect of a memory module integrated with a wireless component in accordance with the present invention. In one exemplary example, a multiple chips package (MCP) technology is introduced into one manufacturing process for producing the package in accordance with the present invention. A low-cost solution for cellular communication device may be achieved by the aspect of eMMC-NFC combination.

A portable communication device 20 is provided. In an exemplary example of the portable communication device 20, one module 203 or a package is configured to combine an eMMC component and an NFC component. An antenna set 204 is also provided to link with the module 203.

In the present example, the mentioned eMMC component includes an eMMC controller and a proprietary non-volatile memory unit, for example the flash memory. Specifically, since the eMMC controller is specified to have the more pins than it uses, the remaining pins can be shared with NFC component. Therefore, the eMMC controller is one of the best solutions to be the controller of this memory module for implementing the integration. The controller simultaneously manages both functionalities of conventional eMMC component and NFC component. When some available pins of the conventional eMMC controller are configured to process the NFC access, the integration may effectively reduce the cost as it uses the existing pins.

Figure 3:
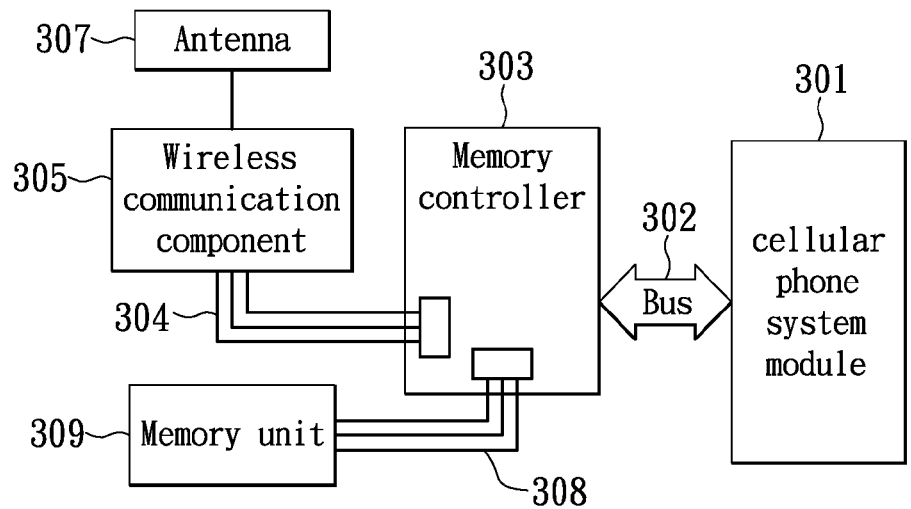
FIG. 3 depicts a block diagram illustrating the memory module of one embodiment of the present invention.

FIG. 3 depicts a block diagram illustrating the memory module of one embodiment of the present invention. In which, the aspect of one module integrated with the wireless communication component and the memory component is shown.

The memory module includes a control unit (the memory controller 303) which is packaged of pins wired to a wireless communication component 305 linked to an antenna set 307 and a non-volatile memory unit 309. This control unit acts as a memory controller 303 shown in the figure which is in charge of processing the signals from or to the wireless communication component 305 and the non-volatile memory unit 309. In an exemplary embodiment, the memory controller 303 is configured to handle the data access for the non-volatile memory unit 309 over an interface 308. That means the memory controller 303 serves as the original way to access the data in the non-volatile memory unit 309 for the cellular phone system module 301. If the non-volatile memory unit 309 is a flash memory, the interface 308 may be implemented as a conventional flash interface.

In particular, there exists some remaining pins of the memory controller 303 other than the pins used for the non-volatile memory unit 309. Those remaining pins may be shared to be the interface 304 to the wireless communication component 305. For the example of the wireless communication component 305 acting as an NFC chip, the interface 304 can be implemented as a type of asynchronous receiver/transmitter (UART) or serial peripheral interface (SPI).

Further, the control unit (memory controller 303) in charge of processing the data from different components interconnects with the cellular phone system module 301 over a data bus 302. This data bus 302 may be implemented by an eMMC bus since the control unit acts as an eMMC controller which can be applied to serve the eMMC signals. Therefore, the eMMC-based bus (data bus 302) is preferably used to interconnect between the cellular phone system module 301 and the eMMC controller. It is worth noting that the eMMC bus is one of the fastest buses among the peripherals.

Rather than the file system often used in the device to manage the peripherals, the present invention introduces an aspect of the data storage area partitioning to manage the access process to the NFC unit. In which, a partition table shall be maintained. It is worth noting that, according to the conventional SD-NFC application, the related NFC function may be invalid when the file system was crashed. Rather than the conventional technology, the NFC function will not be affected as the file system fails because the NFC-related data can be managed via the partition table in accordance with the present invention. For example, when the apparatus uses the NFC component to receive the signals, the signals may be stored in the storage of the apparatus. In accordance with the present invention, the NFC signals may be directed to other storage medium when the mapping partition is modified as the original storage fails.

It is further noted that the eMMC has inherent aspect of partitions, and in which the every partition is served to access one target, access a partition, and also allowed to access components by switching partition.

A partition table (for example, the 407 of FIG. 4) is introduced to specifying accessing the NFC unit rather than the conventional scheme using the file system structure. Therefore, the claimed scheme may prevent the failure of the NFC function from the damage of the file using traditional file system specified to access the NFC data. The partition table usually describes a data storage partitioning operated to divide storage area into multiple logical storage units referred to as partitions. Each logical storage unit is mapped to one physical storage area as if the data storage is configured to have multiple divided storage areas. In accordance with the present invention, one of the partitions designated in the partition table is mapped to the NFC unit of the module, and other one of the partitions is mapped to the non-volatile memory unit.

It is also worth noted that the structure of the partition table may protect and isolate the destination(s) to be accessed. Partitions make the whole system easier to recover the corrupted file system or any designated operating system. The designated NFC unit is also protected when any other designated component of the system is corrupted. Thus the NFC-related data may not be affected as it is isolated from other data.

Figure 4:
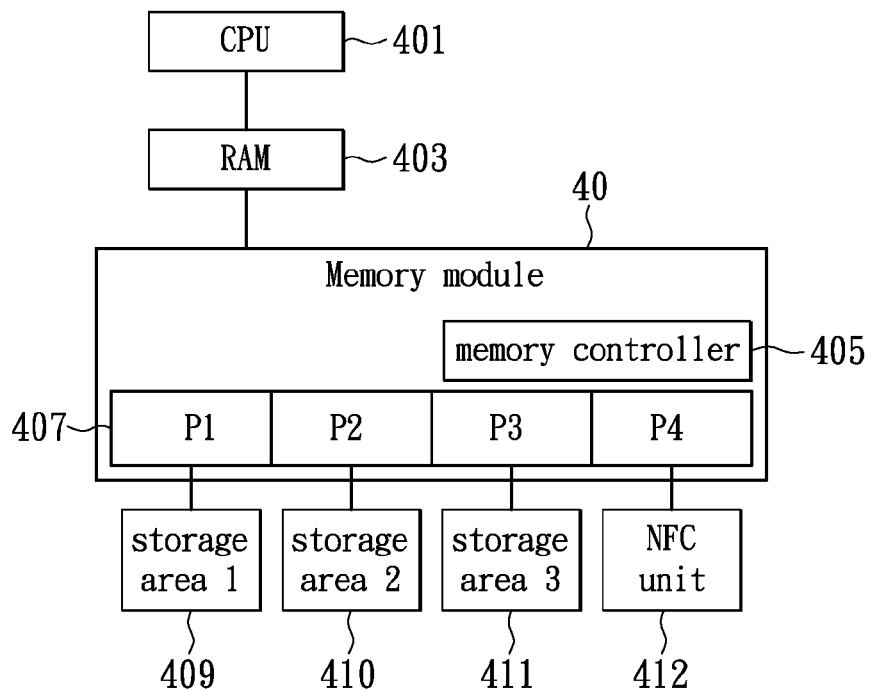
FIG. 4 describes a partition table which configures the access path of the memory module of an embodiment of the present invention.

According to one of the embodiments of the invention, FIG. 4 is referred to describe a partition table which configures the access path of the memory module. FIG. 4 also introduces an apparatus, such as a cellular phone, which constitutes a communication system including a CPU (401), a RAM (403), and a storage medium. Exemplarily, this storage medium is the memory module (40) packaged of a wireless communication component coupled with an antenna, and a non-volatile memory unit.

The mentioned communication system and the memory module is exemplarily interconnected over an eMMC bus, which makes the whole system with an advantage of with one of the fastest buses among the peripherals. Furthermore, the eMMC bus is served to establish an access path between the communication system and the memory module, especially when the communication system sends a write/read command to the control unit to access any partition.

In the present invention, the aspect of partitioning structure is introduced to accessing any file stored in any destination where the system designates. It is noted that the partition table will be loaded into the system memory (for example the random access memory) when the system boots up. In the present invention, the controller of the memory module may also direct the data written into the external memory if the internal memory fails (full, near full or damaged).

The shown memory module 40 is one of the components in the communication system, which is a computer-like system essentially including the CPU 401, the RAM (random access memory) 403, and the memory module 40. The memory module 40 is such as a flash memory module preferably packaging a non-volatile memory and a wireless communication component in accordance with the present invention. In particular, a partition table 407 is maintained in the memory module 40, and managed by a built-in control unit, shown as the memory controller 405. This memory module 40 is usually the main storage built in the apparatus. The partition table 407 exemplarily records several partition IDs referred to different storage areas (the partitions). In the present example, P1 is a partition ID referred to storage area 1 (409), P2 is the other partition ID referred to storage area 2 (410), and P3 is one further partition ID which is referred to storage area 3 (411). In the same aspect, the shown partition ID P4 is mapped to an NFC unit 412.

When the portable communication module starts up, the partition table 407 stored in the main memory 405, the non-volatile memory, will be copied to the RAM 403 conducted by the CPU 401. If any partition mapping changes, the partition table 407 can be accordingly modified. Meanwhile, when the portable communication module generates any request to access the storage area 2, the operating system of the CPU 401 looks up the partition table 407 and checks the record of the partition ID P2. P2 refers a logical storage unit where the portable communication module accesses. P2 then directs the access command to the storage area 2.

In an exemplary example, for accessing the NFC unit 412, the portable communication module generates a request, such as a partition-switching command, and CPU 401 looks up the partition table 407. In accordance with the example described in FIG. 4, the CPU 401 checks out the P4 mapped to the destination, exemplarily the NFC unit 412, according to the partition table and the request. After that, the operating system logically accesses the P4 which directs the access command to the mapped NFC chip 412.

Figure 5:
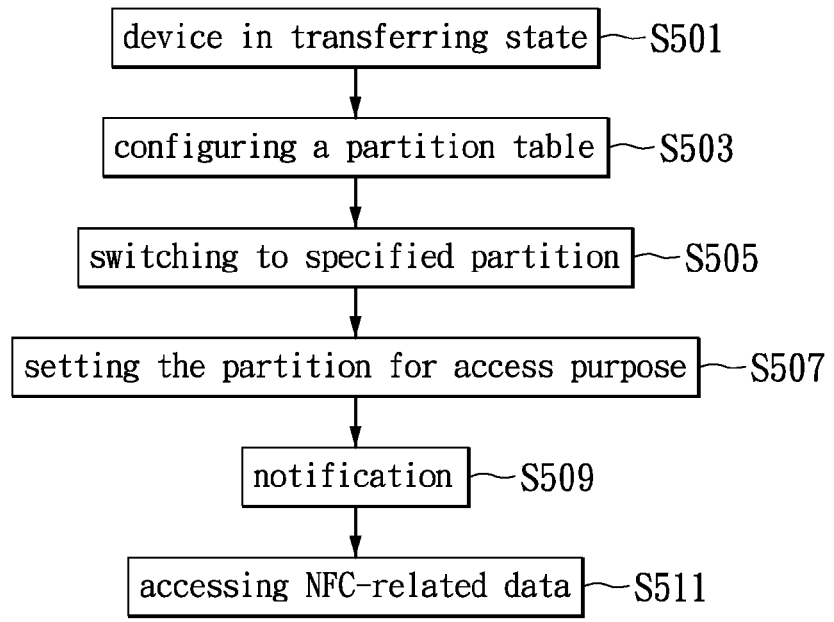
FIG. 5 shows a flow chart describing an operating method for an host installed with the memory module in one embodiment of the present invention.

FIG. 5 shows a flow chart describing an operating method for the cellular phone system module installed with the memory module of the present invention. The cellular phone system module is installed with the memory module integrated with a wireless communication component.

As step S501 describes, the cellular phone system module is transformed to a transferring state while a request to access the wireless communication component is sent. For example, the cellular phone system module may be installed with a program (or any agent software) which allows a user to access the wireless communication component. The cellular phone system module can be in the transferring state when the cellular phone system module initiates a partition-switching command to the control unit of memory module. Exemplarily, when the program is executed, the cellular phone system module is set as the transferring state and ready to access the wireless communication component. On the other hand, the wireless communication component may also activate the cellular phone system module to be in the transferring state when the component is accessible by the other device with a compatible protocol. The wireless communication component wired to the control unit is an NFC chip configured to conduct near-field communication signals. The related embodiment of the NFC unit described in FIG. 4 is packaged of an NFC reader and an NFC RF (radio frequency) component. In which, the NFC reader is generally used to receive the signals transmitted from the cellular phone system module or the external source. NFC reader is able to read and to identify the NFC-related data or un-related data. The NFC RF component is in charge of processing transformation from the data to NFC-enabled signals or from NFC-enabled signals to data sent to the cellular phone system module.

The NFC reader and the NFC RF serve to detect any entry signal from any external source through its antenna. The cellular phone system module then initiates its transferring state as confirming the communication with the external source.

Further, in step S503, the control unit configures a partition table stored in the non-volatile memory unit. The partition table records the partitions IDs mapped to different storage areas of the non-volatile memory unit, and some accessible components such as the NFC unit and non-volatile memory unit. In general, the partition table is managed by control unit. When the control unit is configured to access a destination, the control unit firstly looks up the partition table and finds out the corresponding partition. As the step S505 describes, the control unit switches to the specified partition by generating an instruction. The partition records an address mapped to a hardware area, for the present purpose, it is specified to the wireless communication component. As in step S507, the control unit then sets the partition for access purpose.

It is noted that, the control unit may fail to find out the partition table nor any other partitioning information that means the control unit may not support the partitioning feature, and the control unit may not be configured at this issue.

When the process is confirmed, the control unit will be notified that the control unit has completed partitioning configuration (step S509). The control unit is then able to access the wireless communication component (step S511). The operating system preferably accesses the logical storage unit represented by the specified partition, and the access instruction (read/write) will be directed to the component. Through the control unit packaging pins wired to the wireless communication and the non-volatile memory unit, the cellular phone system module achieves the access to the wireless communication component.

Furthermore, the non-volatile memory unit packaged in the memory module is also wired to the control unit. The non-volatile memory unit is preferably a non-volatile memory designated for an embedded MultimediaCard (eMMC) component. In accordance with the present invention, the eMMC component is one of the components packaged in the memory module. For and exemplary embodiment of the present invention introducing the NFC and eMMC components packaged in the memory module, the control unit processing the data exchange between the NFC chip and the non-volatile memory unit connects to the cellular phone system module over an eMMC bus.

Figure 6:
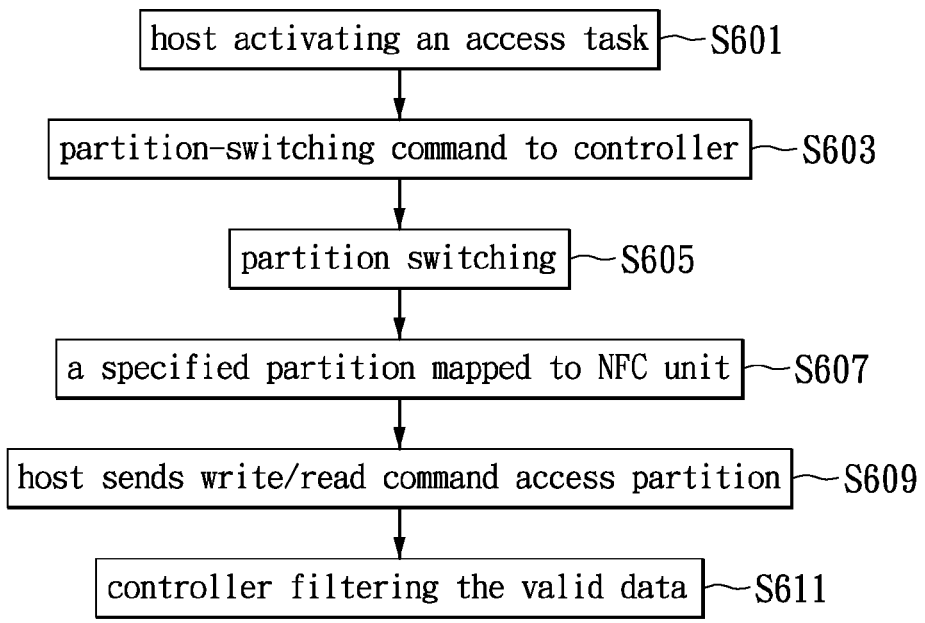
FIG. 6 shows a flow chart describing the operating steps when the host transmits data through the memory module in one embodiment of the present invention.

FIG. 6 next shows a flow chart describing the operating steps when the cellular phone system module transmits data through the memory module in one embodiment of the present invention.

In the beginning of the steps, such as step S601, the cellular phone system module activates an access task. In general, the operation system of the cellular phone system module initiates a process to access its peripherals, for example the wireless communication component or the non-volatile memory unit, by issuing a partition-switching command to control unit, that exemplarily the controller of the memory module which integrates the wireless communication component and the memory. After the partition-switching command is sent, an accessing path between the cellular phone system module and the memory module over the eMMC bus is established. Then the cellular phone system module is able to send a write/read command to access the related partition.

Every cycle the cellular phone system module sends the instruction to the memory module in accordance with the present invention to drive the memory module to conduct partition-switching (step S605). While the access process is initiated, a specified partition mapped to NFC unit will be set (step S607). In the meantime, the operating system can recognize the destination to be accessed through the partitioning structure. The partition is specified to designate a logical storage unit having an address. The logical storage unit is directed to a physical storage area according to the address. The cellular phone system module accesses the partition to be specified rather than to the file system directly.

In step S609, the cellular phone system module sends write/read command to access partition after the access path is established. Since the control unit (for example the controller of the memory module) is used to manage the data exchange between the cellular phone system module and the memory module including the wireless communication component and the non-volatile memory unit, the control unit conducts a filtering operation to pass the valid data (step S611). For example, the control unit is used to acquire the NFC-related data and disregard the data irrelevant to NFC.

Figure 7:
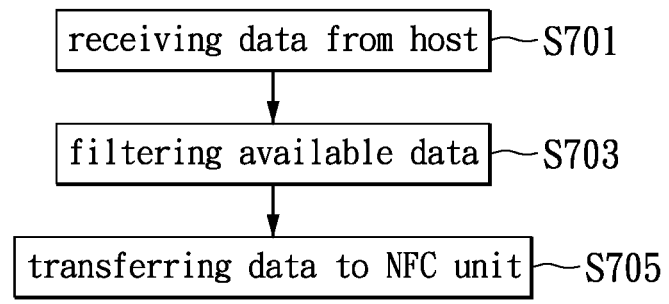
FIG. 7 shows a flow chart describing the steps of filtering available data when the host sends data according to the present invention.

If the data is from the non-volatile memory unit when the cellular phone system module requests the data in the non-volatile memory unit, the control unit may accordingly filters out the irrelevant data and delivers the valid data to the cellular phone system module. On the other hand, if the data is from the NFC chip, the control unit may firstly recognize the type of data and delivers the NFC-enabled data to the cellular phone system module. The operating system then converts the data into the type of eMMC compatible format and transmits them to the non-volatile memory unit. Furthermore, when the cellular phone system module initiates a transmission instruction, firstly the control unit checks the partition table which is loaded to the RAM, and then cellular phone system module sends data to the memory module. The control unit then receives data from the cellular phone system module (step S701, FIG. 7), and the control unit filters the available data (step S703, FIG. 7), and transferring the available data to the destination, for example the NFC chip (step S705, FIG. 7).

Based on the above-described embodiments in accordance with the present invention, the memory module linked to the cellular phone system module may be with or without any security component. If the NFC-enabled device is regarding the payment, security component should be introduced. Preferably, the NFC chip is built in with the security component.

One aspect of the present invention introduces an apparatus which is installed with the memory module packaged of the wireless communication component and the non-volatile memory unit. In one embodiment of the invention, the apparatus is a wireless communication device.

In summation, the disclosure is related to an operating method, an apparatus and a memory module integrated with a wireless communication component. In which, the memory module is a package which is packaged of a wireless communication component and a memory component. NFC technology embodies the wireless communication component, and eMMC is preferably the memory component. A control unit of the memory module is particularly configured to conduct the two components. The present invention also uses partitions to access the wireless communication component/non-volatile memory unit rather than the file system used in the conventional way.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A memory module, comprising:
   a wireless communication component coupled with an antenna;
   a non-volatile memory unit;
   a control unit coupled to the wireless communication component and the non-volatile memory unit, allowing a cellular phone system to access the wireless communication component and the non-volatile memory unit by checking a partition table, wherein the partition table is configured to have at least two partitions respectively mapped to the wireless communication component and the non-volatile memory unit, and be managed by the control unit to direct an access command to the wireless communication component or to the non-volatile memory unit according to a partition-switching command initiated by the cellular phone system; and
   an eMMC bus interconnected with cellular phone system and the control unit;
   wherein, the cellular phone system accesses the wireless communication component or the non-volatile memory unit via the control unit.

2. The memory module according to claim 1, wherein the wireless communication component is an NFC chip configured to conduct near-field communication signals.

3. The memory module according to claim 2, wherein the NFC chip packaging an NFC reader and an NFC RF component.

4. The memory module according to claim 1, wherein the non-volatile memory unit is a flash memory.

5. An operating method for a memory module, wherein the memory module includes a control unit coupled to a wireless communication component and a non-volatile memory unit, the method comprising:
   configuring a partition table maintained in the memory module; wherein, according to the partition table, allowing a cellular phone system to access the wireless communication component and the non-volatile memory unit;
   wherein the partition table is configured to have at least two partitions respectively specified to the wireless communication component and the non-volatile memory unit, and be managed by the control unit to direct an access command to the wireless communication component or to the non-volatile memory unit according a partition-switching command initiated by the cellular phone system; and
   setting the partition for accessing the wireless communication component or the non-volatile memory unit based on the partition table.

6. The operating method according to claim 5, wherein the wireless communication component is an NFC chip.

7. The operating method according to claim 6, wherein the access path between the cellular phone system and the control unit is over an eMMC bus.

8. The operating method according to claim 6, further comprising:
   the control unit receiving data from cellular phone system; and
   the control unit filtering available data, and transferring available data to the NFC chip according to the partition table.

9. The operating method according to claim 5, wherein, after the partition-switching command is sent, an access path is established as the cellular phone system sends a write/read command to access the partition.

10. An apparatus, comprising:
    a cellular phone system including a CPU, and a RAM conducted by the CPU;
    a memory module, packaged of a wireless communication component coupled with an antenna, and a non-volatile memory unit;
    a control unit, packaged in the memory module and coupled to the wireless communication component and the non-volatile memory unit, and accessing the wireless communication component and the non-volatile memory unit by checking a partition table,
    wherein the partition table is stored in the non-volatile memory unit and managed by the control unit, and the partition table is configured to have at least two partitions respectively specified to the wireless communication component and the non-volatile memory unit;
    an eMMC bus interconnected with the cellular phone system and the memory module, and being an access path there-between;
    wherein, the cellular phone system accesses the wireless communication component or the non-volatile memory unit via the control unit according to a partition-switching command initiated by the cellular phone system.

11. The apparatus of claim 10, wherein the partition table specifies the access path established as the cellular phone system sends a write/read command to the control unit to access a partition.

12. The apparatus of claim 10, wherein the wireless communication component is an NFC chip built in a cellular phone.

13. The apparatus of claim 10, wherein the non-volatile memory unit in the cellular phone is an eMMC.

* * * * *